April 16, 1940.  L. J. PAGE  2,197,020
BIFOCAL OPHTHALMIC MOUNTING
Filed May 28, 1938
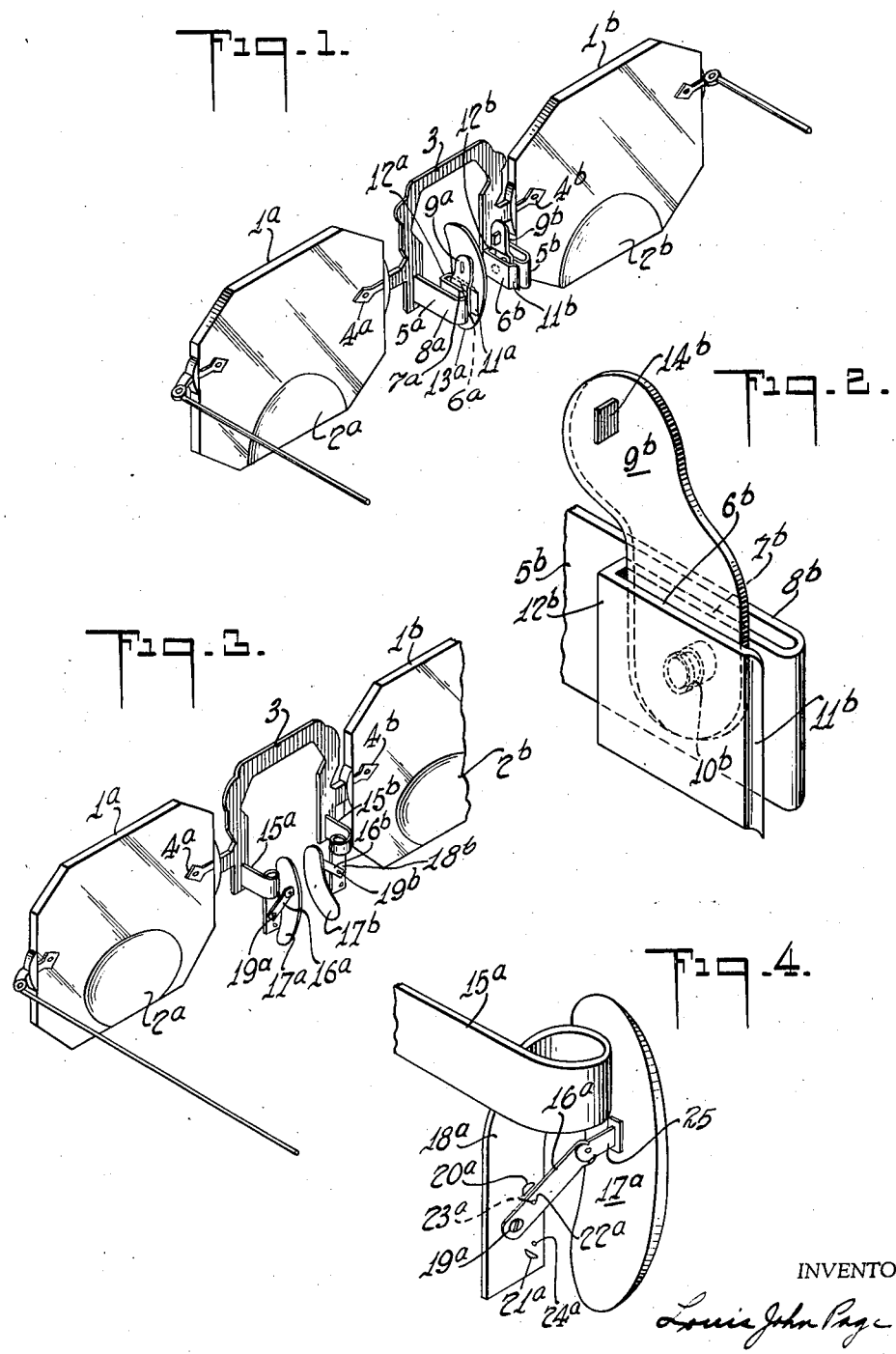
INVENTOR.
Louis John Page Patented Apr. 16, 1940

2,197,020

UNITED STATES PATENT OFFICE 2,197,020

BIFOCAL OPHTHALMIC MOUNTING

Louis John Page, Hollis, N. Y.

Application May 28, 1938, Serial No. 210,569

2 Claims. (Cl. 88—49)

This invention relates to an improvement in bifocal ophthalmic mountings, and more particularly to a mounting having novel means for readily adjusting the bifocal lenses in predetermined positions before the eyes in a manner that they may be readily raised or lowered in order to bring either the distance portion or the reading portion into position for use as desired by the wearer.

This invention is a continuation in part of my copending application Serial #69,608, filed March 19, 1936, and entitled "Adjustable nose pad mounting for raising and lowering bifocal lenses," in which there is claimed an adjustable nose pad mounting in which the adjustment is secured by means of a pad having a shaft mounted eccentrically thereon.

The adjustable feature of a bifocal mounting or bridge gives the wearer a means of placing the bifocal lenses in a position more advantageous for comfortable and easier vision.

For near vision the lenses are raised, whereas for distance or walking the lenses are lowered before the eyes.

The adjustable bifocal mounting is a bridge which may be fitted to rims made to hold the lenses, or fitted directly to the lenses.

In this invention the nose pads are equipped preferably with hangers. The hangers are preferably mounted in turn on arms secured to the bridge member. These arms are equipped both with stops and latching devices so that the hangers may be latched in either a raised or lowered position. The hangers are raised or lowered by rotating them about their respective pivots which form their means of attachment to the arms.

The object of my invention is to improve the means of raising and lowering the nose pads of the bridge by a new and novel arrangement of pad suspension from the bridge arms.

Another object of my invention is to improve the construction of the rotating pad type bridge as to strength, wear, function and to lend itself more readily to manufacture.

Figure 1 is a view of a pair of spectacles in which my invention is incorporated, the nose pad proper on the right glass being omitted for sake of clarity.

Figure 2 is an enlarged view of the right-hand hanger and a portion of the supporting arm of Figure 1.

Figure 3 is a view of a modified form of my invention applied to a pair of spectacles which is shown partly broken away.

Figure 4 is an enlarged view of the hanger supporting arm together with nose pad for the left-hand hanger Figure 3.

Now referring to Figure 1 and the enlarged view, Figure 2, the left-hand glass 1a and the right-hand glass 1b have the reading positions 2a and 2b respectively. These glasses are mounted on the bridge 3 by means of the attaching members 4a and 4b. On the bridge 3 are mounted the arms 5a and 5b in any suitable manner. The arm 5a as shown is bent back on itself forming three substantially parallel portions, 6a, 7a and 8a; and the arm 5b is similarly bent back on itself forming three substantially parallel portions, 6b, 7b and 8b. The portions 8a and 8b are toward the lenses while the portions 6a and 6b are toward the nose pads. The portions 6a and 7a, and 6b and 7b respectively have placed between them the hanger members 9a and 9b which are respectively rotatably attached to one or both of these surfaces by means of pivots such as 10b. The members 6a and 6b, which are preferably resilient are further bent as at 11a and 11b so as to form a latching mechanism holding the arms 9a and 9b respectively in either the position shown in the drawing or in the reversed position obtained by swinging the hangers through 180°. The portions 6a and 7a at the point of bending create a surface 12a and similarly the portions 6b and 7b create a surface 12b. These surfaces 12a and 12b operate as stops respectively preventing the hanger members 9a and 9b from swinging through an arc in excess of 180° from their upward position to their downward position. The combination of resilient member 11a and the surface 12a serves to hold hanger member 9a fixed in either the upward or the downward position after it has been turned to either one of these two positions. Similarly resilient member 11b and surface 12b hold hanger member 9b fixed. The pad 13a is attached to the hanger member 9a and in a similar manner a pad (not shown) is attached to the hanger member 9b by any single means such as the pin 14b, so that these pads will rotate with respect to the hanger members in a restricted manner.

Now referring to the modified form shown in Figure 3 together with the enlarged view of Figure 4, the left-hand glass 1a and the right-hand glass 1b have the reading portions 2a and 2b respectively. These glasses are mounted on the bridge 3 by means of the attaching members 4a and 4b. On the bridge 3 are mounted the arms 15a and 15b in any suitable manner. The arm members 15a and 15b are shown bent so as to form the portions 18a and 18b with their broad surfaces substantially parallel to the plane of the lenses 1a and 1b. Hangers 16a and 16b are respectively attached to portions 18a and 18b by means of pivots 19a and 19b in a manner that the hangers lie substantially parallel with the broad surfaces of the portions 18a and 18b and are rotatable on the pivots 19a and 19b in a plane substantially parallel to the portions 18a and 18b. On portions 18a, two stops 20a and 21a are provided to limit the motion of hanger member 16a about the pivot 19a. Also provided on portion 18a, are two depressions 23a and 24a. Hanger member 16a is provided with a protruding member 22a which will engage depressions 23a and 24a to latch the member in either an upward or downward position as limited by the stops 20a and 21a. Hanger member 16b is attached to portion 18b and is provided with similar stops and latching means as described above. The pads 17a and 17b are attached to the hanger members 16a and 16b by any suitable means such as 25.

In all of the figures the pads are shown so that the lenses are in the lower position, suitable for distance vision. Rotation of the hanger members in all of the figures will raise the lenses to the reading position. In Figures 1 and 2 this rotation is accomplished by manually turning the pads and hangers individually about their pivots until they lock in the desired position. In Figures 3 and 4 the pads may be raised or lowered individually by hand, or once the pads are adjusted on the nose the lenses may be raised or lowered by pulling or pushing on the bridge until the hanger arms lock in the desired position. This can be more readily accomplished when the pads are so designed as to grip the nose tightly as is usual in nose glasses.

Many changes may be made in the construction without departing from the spirit of my invention. For example, the hanger may be held in the desired position by friction due to the pressure of the hanger against one or both of the adjacent surfaces of the arm.

Now having described my invention so that it may be readily understood by one skilled in the art, I claim:

1. In combination in a spectacle or eyeglass, a bridge, a pair of lenses, means for attaching said lenses to said bridge; an arm; means for attaching said arm to said bridge, the free end of said arm terminating in a U shaped portion extending rearwardly from said bridge; a hanger; said hanger mounted pivotally at one end between the plates of the U shaped portion; a nose pad; said nose pad being attached to the free end of the hanger, said hanger and attached nose pad pivoting in planes substantially at right angles to the plane of the bridge, a resilient extension on the U shaped portion of the arm engaging the hanger releasably securing hanger and pad in predetermined positions.

2. In combination in a spectacle or eyeglass, a bridge, a pair of lenses, means for attaching said lenses to said bridge; an arm; said arm attached to the rear side of said bridge substantially perpendicular thereto, curved, terminating in a loop or U-shaped portion; a nose pad; a hanger mounted to said nose pad, the free end of said hanger mounted to the loop of said arm by means of a pivot, said pivot directed in a plane substantially parallel to the plane of the bridge, connecting the sides of the U shaped portion formed by the loop, so as to permit pivoting of the nose pad and hanger between said sides, said pad releasably secured in positions up or down by means of a resilient extension on the U shaped portion.

LOUIS JOHN PAGE.